US009402146B2

United States Patent
Khan et al.

(10) Patent No.: US 9,402,146 B2
(45) Date of Patent: Jul. 26, 2016

(54) ON-DEVICE MOVEMENT OF AN EXISTING MOBILE NUMBER

(71) Applicant: Cellco Partnership, Arlington, VA (US)

(72) Inventors: Taussif Khan, Monroe, NJ (US); Ruben Cuadrat, New York, NY (US); Zhengfang Chen, Millburn, NJ (US); Pugazholi Thyagarasan, Edison, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 63 days.

(21) Appl. No.: 14/306,719

(22) Filed: Jun. 17, 2014

(65) Prior Publication Data
US 2015/0365778 A1     Dec. 17, 2015

(51) Int. Cl.
*H04W 4/00*     (2009.01)
*H04W 8/20*     (2009.01)
*H04W 8/18*     (2009.01)

(52) U.S. Cl.
CPC ............... *H04W 4/001* (2013.01); *H04W 8/18* (2013.01); *H04W 8/20* (2013.01); *H04W 8/205* (2013.01)

(58) Field of Classification Search
None
See application file for complete search history.

(56) References Cited

U.S. PATENT DOCUMENTS

| 2008/0166993 A1* | 7/2008 | Gautier | H04W 8/265 455/405 |
| 2009/0037207 A1* | 2/2009 | Farah | H04W 8/205 705/301 |
| 2012/0254327 A1* | 10/2012 | Tiger | H04W 4/18 709/206 |
| 2013/0132854 A1* | 5/2013 | Raleigh | H04W 4/24 715/738 |
| 2015/0172997 A1* | 6/2015 | Griot | H04W 48/08 455/411 |

OTHER PUBLICATIONS

Meredith, "The Mobile Broadband Standard", Mar. 27, 2014, 6 pages.
European Telecommunications Standards Institute (ETSI), "Smart Cards; Card Application Toolkit (CAT)" Release 8, ETSI TS 102 223 V8.2.0, Jan. 2009, 203 pages.
Verizon Wireless, "LTE 3GPP Band 13 Device Requirements and Testing Announcements", Version 10.0, 2012, 20 pages.

* cited by examiner

*Primary Examiner* — Lester Kincaid
*Assistant Examiner* — Daniel G Bassett

(57) ABSTRACT

An un-provisioned user device may send, via a cellular network, a request associated with receiving a service provided by a service provider. The user device may receive, via the cellular network, a response indicating that the user device has limited access to the cellular network. The user device may identify, based on a user account with which the user device is to be associated, a particular existing mobile directory number (MDN), associated with the user account, that is to be moved to the user device. The user device may send, via the cellular network, a movement request to move the particular existing MDN to the user device. The movement request may be sent to cause the particular existing MDN to be associated with the user device such that the user device is provisioned to receive the service using the particular existing MDN.

20 Claims, 10 Drawing Sheets

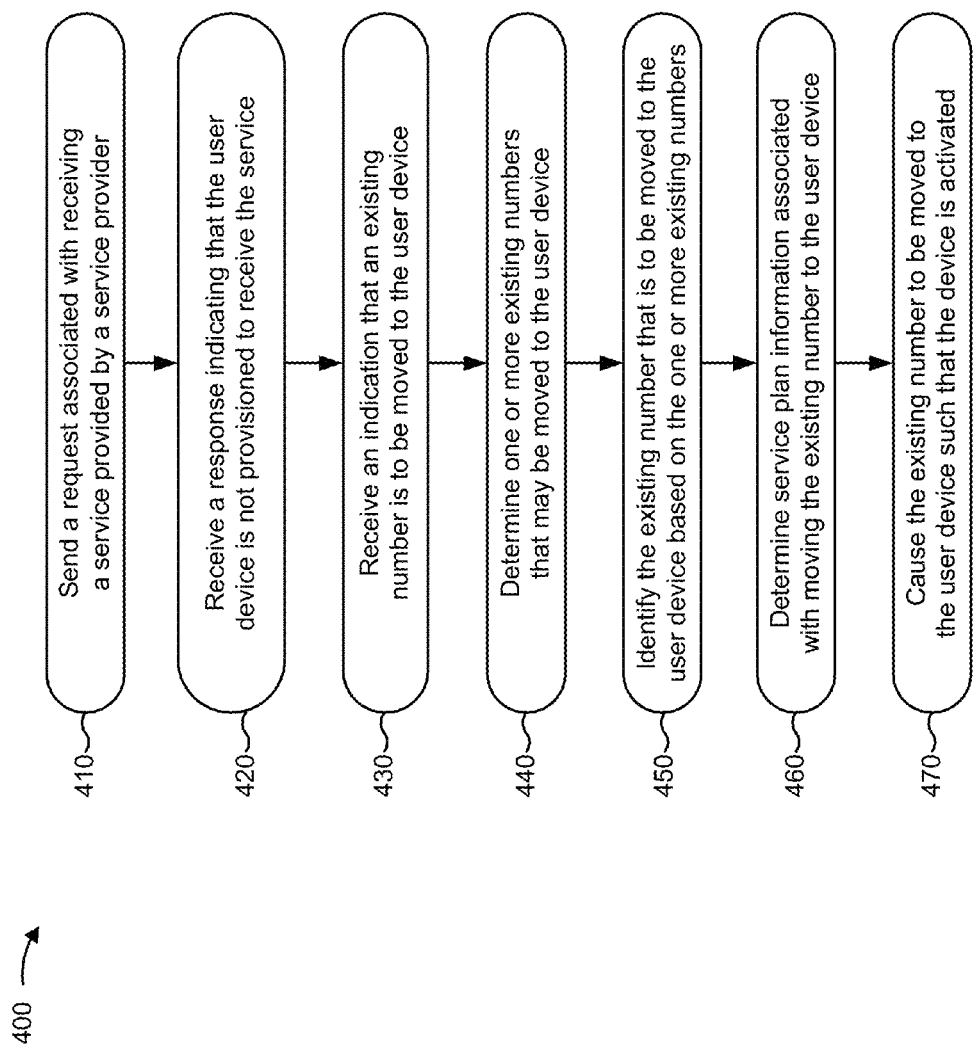

ON-DEVICE MOVEMENT OF AN EXISTING MOBILE NUMBER

BACKGROUND

A user device (e.g., a smart phone, a tablet, a mobile phone, etc.) may be required to be provisioned and activated in order to receive a service (e.g., a voice service, a data service, a payment service, etc.) via a service provider network. The user device, when provisioned, may be associated with a number (e.g., a mobile directory number (MDN), etc.) that allows the user device to receive the service via the service provider network.

BRIEF DESCRIPTION OF THE DRAWINGS

FIG. 4 is a flow chart of an example process for moving an existing number, associated with a user account, from a first user device to a second user device using the second user device.

DETAILED DESCRIPTION OF PREFERRED EMBODIMENTS

The following detailed description of example implementations refers to the accompanying drawings. The same reference numbers in different drawings may identify the same or similar elements.

A user may wish to switch from using a first user device to using a second user device while keeping an existing number (e.g., a mobile directory number (MDN)) associated with a user account of the user. The user may also wish to keep a service plan (e.g., a voice plan, a messaging plan, a data plan, etc.) such that the second user device may receive services according to the service plan. In order to achieve this, the user may be required to call a service provider customer service center, travel to a store associated with the service provider, and/or navigate a website associate with the service provider. This may also be the case when the user is replacing a lost, stolen, and/or damaged user device and/or subscriber identity module (SIM) card associated with the user device, when the user wishes to move an existing MDN from a third generation (3G) code division multiple access (CDMA) user device, that does not include a SIM card, to a fourth generation (4G) LTE user device that must use a SIM card, or another type of situation.

Implementations described herein may allow a user to use a second user device to move an existing number, associated with the user and a service provider, from a first user device to the second user device. In this way, the user may not be required to travel to a store associated with the service provider, call the service provider, and/or navigate a service provider website in order to move the existing number from the first user device to the second user device.

Figure 1:
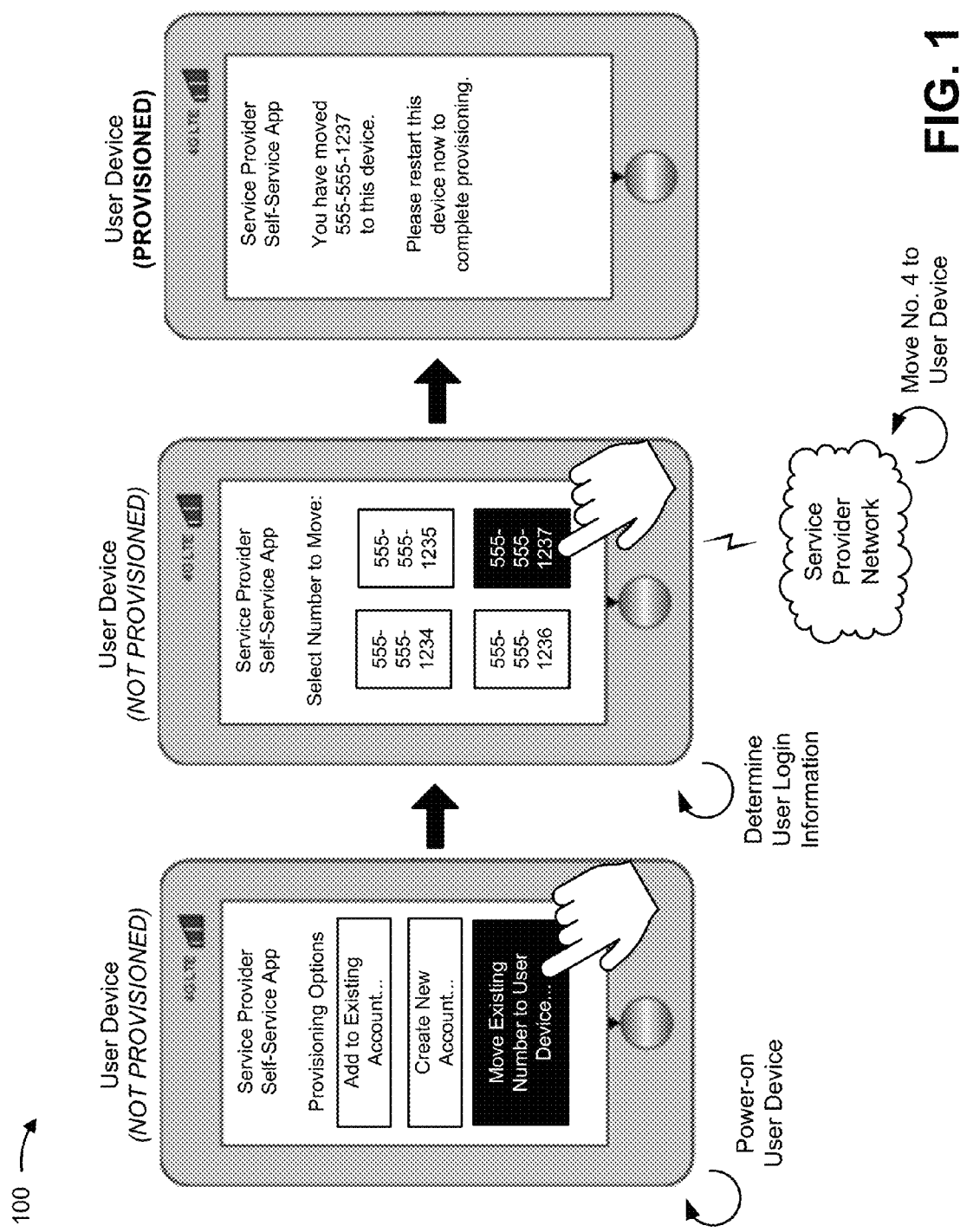
FIG. 1 is a diagram of an overview of an example implementation described herein.

FIG. 1 is a diagram of an overview of an example implementation 100 described herein. For the purposes of example implementation 100, assume that a user has a user account with a service provider, and that the user account allows four existing numbers (e.g., MDNs) to be used by four user devices (not pictured), associated with the user, to receive services via a service provider network. Further, assume that the user has obtained a new user device that is un-provisioned (e.g., not activated), and that the user wishes to move one of the four existing numbers to the new user device (e.g., such that the new user device may receive services using one of the four existing numbers).

As shown in the left portion of FIG. 1, the user may power-on the new user device. The new user device may attempt to connect to the service provider network, and may receive, from a device included in the service provider network, an indication that the new user device is not provisioned. As further shown, based on receiving the indication, the new user device may execute a self-service application associated with provisioning the new user device for use on the service provider network. In some implementations, the new user device may be permitted to communicate with a self-service portal device, associated with the self-service application via the service provider network (e.g., with restricted access), even though the new user device is not provisioned for receiving services via the service provider network.

As further shown by the left portion of FIG. 1, the new user device may display, for selection by the user, one or more provisioning options associated with provisioning the new user device. As shown, a first provisioning option may allow the user to add the new user device to an existing user account (e.g., and obtain a new number for the new user device), a second provisioning option may allow the user to create a new user account (e.g., and obtain a new number for the new user device), and a third option may allow the user to move an existing number (e.g., a number that is currently assigned to another one of the user's devices or a number that is currently associated with the user, but is not assigned to one of the user's devices, etc.) to the new user device. As shown, the user may indicate (e.g., by selecting a button) that the user wishes to move an existing number, associated with the user account, to the new user device.

As shown in the center portion of FIG. 1, the new user device may determine (e.g., based on user input via the self-service application) login information (e.g., a username, a password, etc.), associated with the user account, and the new user device may determine (e.g., based on communicating with the self-service portal device) account information (e.g., the four existing numbers) associated with the user account. As shown, the new user device may display, for selection by the user, the four existing numbers associated with the user account, and the user may indicate (e.g., by selecting a button) that the user wishes to move a particular existing number (e.g., 555-555-1237) to the new user device. The new user device may provide information identifying the particular existing number to the self-service portal device. As further shown by the center portion of FIG. 1, the self-service portal device, and/or one or more other devices included in the service provider network, may receive information associated with moving the particular number to the new user device, and may cause the particular number to be moved to the new user device (e.g., such that the new user device may receive services, via the service provider network, using the particular number).

As shown by the right portion of FIG. 1, the new user device may receive, via the self-service portal device, an indication that the new user device has been provisioned using the particular number, and indicating that the user is to restart the new user device in order to complete provisioning. In this way, a user may use a user device to move an existing number, associated with the user and a service provider, from another user device to the user device. As such, the user may not be required to travel to a store associated with the service provider, call the service provider, and/or navigate a service provider website in order to move the existing number. Additionally, customer service calls, customer service visits, etc., associated with moving an existing number to a user device, from another user device, may be reduced.

Figure 2:
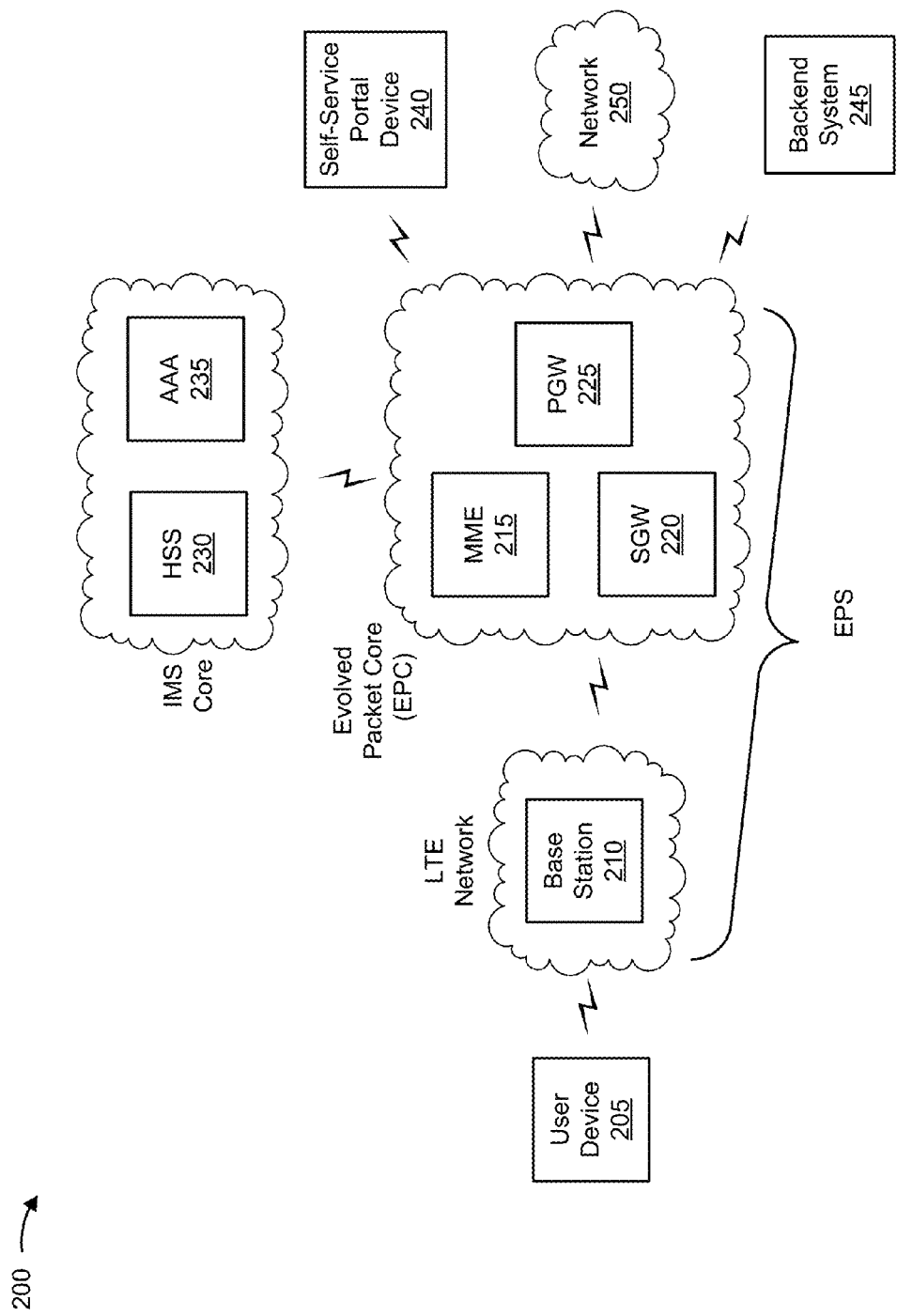
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity (MME) 215, a serving gateway (SGW) 220, a packet data network gateway (PGW) 225, a home subscriber server (HSS) 230, an authentication, authorization, and accounting server (AAA) 235, a self-service portal device 240, a backend system 245, and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a cellular network that is not an LTE network, such as a 3G network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user devices 205 communicate with the EPC. The EPC may include MME 215, SGW 220, and/or PGW 225 that enable user devices 205 to communicate with network 250, and/or self-service portal device 240 and/or an Internet protocol (IP) multimedia subsystem (IMS) core. The IMS core may include HSS 230 and/or AAA 235, and may manage device registration and authentication, session initiation, etc., associated with user devices 205. HSS 230 and/or AAA 235 may reside in the EPC and/or the IMS core.

User device 205 may include a device that is capable of receiving, generating, storing, processing, and/or providing information associated with moving an existing number, associated with a user account, to user device 205. For example, user device 205 may include a cellular telephone, a smart phone, a tablet and/or a similar type of device that communicates via a cellular connection. In some implementations, user device 205 may be capable of receiving and/or providing information associated with a service provided by a service provider (e.g., via the LTE network, the EPC, the IMS core, and/or network 250). In some implementations, user device 205 may include a SIM card associated with receiving the service. In some implementations, user device 205 may not be provisioned with a number (e.g., an MDN) until a number is moved and/or assigned to user device 205. In some implementations, self-service portal device 240 may host an application (e.g., a self-service application) associated with moving an existing number, associated with a user account, to user device 205.

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to user device 205 via SGW 220 and base station 210. PGW 225 may record data usage information (e.g., byte usage), and may provide the data usage information to AAA 235.

HSS 230 may include one or more devices, such as one or more server devices, capable of managing subscription and/or other information associated with a user of user device 205. For example, HSS 230 may receive, store, and/or provide information associated with user device 205, user account information associated with a user of user device 205 (e.g., a username, a password, a personal identification number ("PIN"), an MDN, etc.), subscription information, rate information, minutes allowed, bandwidth allocation policy information, and/or other information. In some implementations, HSS 230 may be capable of determining (e.g., based on information stored by HSS 230) whether user device 205 may receive a service provider by a service provider. In some implementations, HSS 230 may be capable of granting an un-provisioned user device 205 limited access to one or more devices, associated with the service provider (e.g., self-service portal device 240) for the purpose of provisioning user device 205).

AAA 235 may include one or more devices, such as one or more server devices, that perform authentication, authorization, and/or accounting operations for communication sessions associated with user device 205. For example, AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

Self-service portal device 240 may include one or more devices, such as one or more server devices, capable of receiving, generating, processing, storing, and/or providing information associated with moving an existing number to user device 205. Additionally, or alternatively, self-service portal device 240 may be capable of communicating with one or more other devices (e.g., HSS 230, backend system 245) in order to cause the existing number to be moved to user device 205.

Backend system 245 may include one or more devices, such as one or more server devices, capable moving an existing number to user device 205 to allow user device 205 to receive a service provided by a service provider (e.g., via the LTE network, the EPC, the IMS core, network 250, etc.). In other words, backend system 245 may be capable of provisioning user device 205 using an existing number associated with a user account. In some implementations, backend system 245 may include one or more devices and/or systems, such as a device management device, an number inventory device, a billing system, an access manager, a payment system, and/or a point-of-sale system. In some implementations, backend system 245 may receive and/or provide information, associated with moving an existing number to user device 205, from and/or to another device, such as self-service portal device 240.

Network 250 may include one or more wired and/or wireless networks associated with providing a service to user device 205. For example, network 250 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
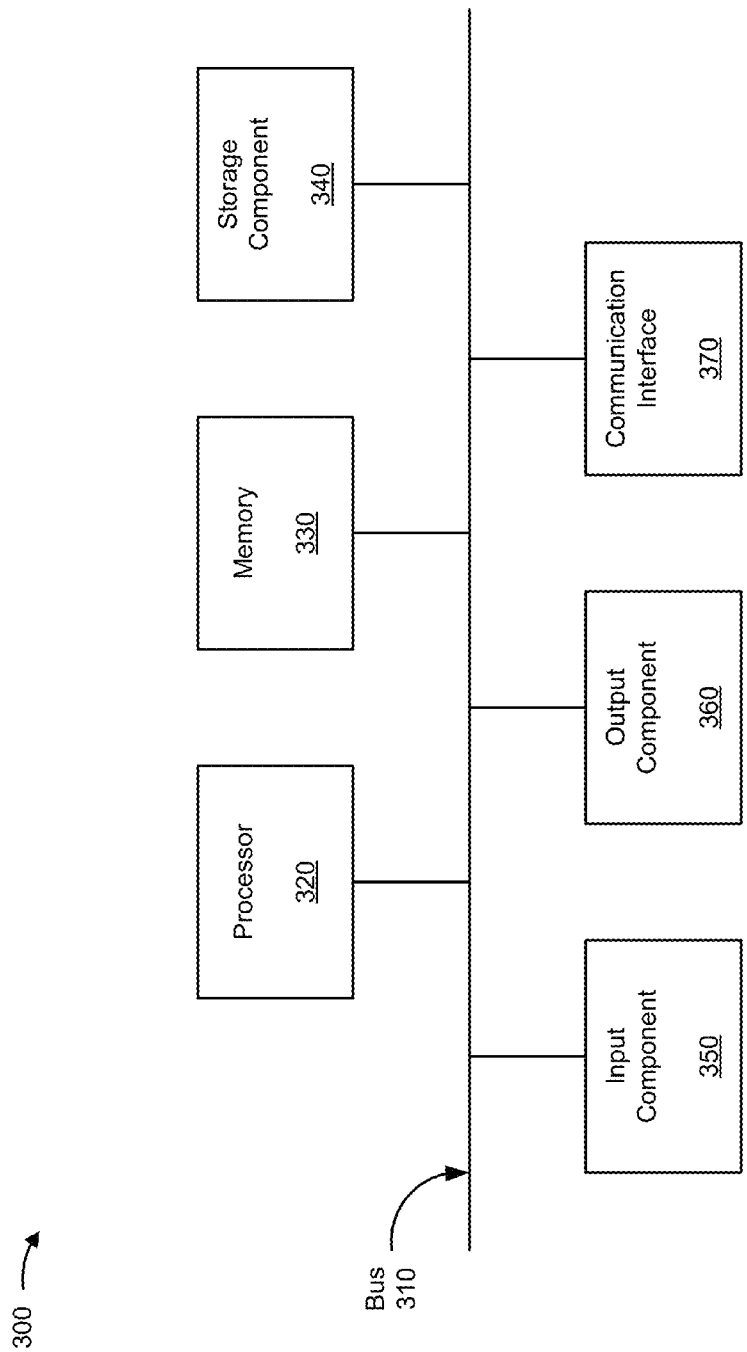
FIG. 3 is a diagram of example components of one or more devices of FIG. 2.

FIG. 3 is a diagram of example components of a device 300. Device 300 may correspond to user device 205, base station 210, MME 215, SGW 220, PGW 225, HSS 230, AAA 235, self-service portal device 240, and/or backend system 245. In some implementations, user device 205, base station 210, MME 215, SGW 220, PGW 225, HSS 230, AAA 235, self-service portal device 240, and/or backend system 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for moving an existing number, associated with a user account, from a first user device to a second user device using the second user device. In some implementations, one or more process blocks of FIG. 4 may be performed by user device 205. Additionally, or alternatively, one or more process blocks of FIG. 4 may be performed by another device or a group of devices separate from or including user device 205, such as self-service portal device 240.

As shown in FIG. 4, process 400 may include sending a request associated with receiving a service provided by a service provider (block 410). For example, user device 205 may send a request associated with receiving a service provided by a service provider (e.g., via the LTE network, the EPC, the IMS core, network 250, etc.) (herein referred to as a connection request). In some implementations, user device 205 may send the connection request after user device 205 powers-on for the first time and/or is able to connect to the service provider network for the first time. Additionally, or alternatively, user device 205 may send the request after user device 205 receives, from a user of user device 205, input indicating that user device 205 is to send the connection request.

A connection request may include a request associated with receiving a service provided by a service provider. In some implementations, the connection request may include information that identifies user device 205 (e.g., a mobile equipment identifier (MEID), an international mobile station equipment identity (IMEI), etc.), information that identifies a SIM card included in user device 205 (e.g., an integrated circuit card identifier (ICCID), an international mobile subscriber identity (IMSI), etc.), and/or other information associated with user device 205.

In some implementations, user device 205 may send the connection request via a cellular network, such as the LTE network associated with the service provider. The connection request may be received by HSS 230, and HSS 230 may determine (e.g., based on information stored by HSS 230) whether user device 205 is associated with a user account. For example, assume that user device 205 is not associated with a user account (e.g., when user device 205 is a new device that has yet to be provisioned). In this example, user device 205 may provide a connection request that includes an IMEI and an ICCID associated with user device 205. HSS 230 may receive the connection request, and may determine (e.g., based on the IMEI, the ICCID, and information stored by HSS 230) that user device 205 is not associated with a user account.

As further shown in FIG. 4, process 400 may include receiving a response indicating that the user device is not provisioned to receive the service (block 420). For example, user device 205 may receive a response indicating that user device 205 is not provisioned to receive the service. In some implementations, user device 205 may receive the response after user device 205 sends the connection request. Additionally, or alternatively, user device 205 may receive the response after the response is provided by another device, such as HSS 230.

In some implementations, the response may indicate that user device 205 is not provisioned. For example, HSS 230 may determine (e.g., based on the connection request) that user device 205 is not associated with a user account, and HSS 230 may provide, to user device 205, a response indicating that user device 205 is not provisioned. Additionally, or alternatively, the response may include information associated with granting user device 205 limited access to the cellular network. For example, HSS 230 may determine that user device 205 is not associated with a user account (e.g., when user device 205 is not provisioned), and HSS 230 may provide, to user device 205, subscription status information (e.g., a subscription status protocol configuration option (PCO) code, etc.) that allows user device 205 limited access to the LTE network. In some implementations, limited access to the cellular network may allow user device 205 to communicate with one or more devices, such as self-service portal device 240, for the purpose of moving an existing number, associated with a user account, to user device 205 and/or provisioning user device 205.

In some implementations, user device 205 may initiate a self-service application, associated with self-service portal device 240, based on being granted limited access to the cellular network. For example, self-service portal device 240 may host a self-service application that allows user device 205 to be provisioned based on limited access to the LTE network. In this example, user device 205 may receive the response (e.g., including a subscription status PCO code), and user device 205 may initiate the self-service application based on the response (e.g., such that user device 205 may communicate, via the LTE network, with self-service portal device 240 based on the limited access to the LTE network).

In some implementations, user device 205 may display information, associated with provisioning user device 205, based on initiating the self-service application. For example, user device 205 may initiate the self-service application, and may receive, from self-service portal device 240, information associated with one or more provisioning options for provisioning user device 205. In this example, user device 205 may display the one or more provisioning options via a user interface of user device 205. A provisioning option may include a manner in which user device 205 may be provisioned, such as by adding user device 205 to an existing user account, creating a new account for user device 205, or moving an existing number, associated with a user account, to user device 205, or the like.

As further shown in FIG. 4, process 400 may include receiving an indication that an existing number is to be moved to the user device (block 430). For example, user device 205 may receive an indication that an existing number is to be moved to user device 205 (e.g., to allow user device 205 to be provisioned using the existing number). In some implementations, user device 205 may receive the indication after user device 205 receives the response to the connection request. Additionally, or alternatively, user device 205 may receive the indication after user device 205 initiates the self-service application and displays the provisioning options associated with provisioning user device 205.

In some implementations, user device 205 may receive the indication based on user input. For example, user device 205 may display (e.g., via a user interface of user device 205) one or more provisioning options (e.g., after initiating the self-service application) to provision user device 205, one of which indicates that user device 205 may be provisioned by moving an existing number, associated with a user account of the user, to user device 205. In this example, the user provide (e.g., by selecting a button, by selecting a menu item, etc.) input indicating that user device 205 is to be provisioned by moving an existing number to user device 205, and user device 205 may receive the indication based on the user input.

As further shown in FIG. 4, process 400 may include determining one or more existing numbers that may be moved to the user device (block 440). For example, user device 205 may determine one or more existing numbers that may be moved to user device 205. In some implementations, user device 205 may determine the one or more existing numbers after user device 205 receives the indication that an existing number is to be moved to the user device. Additionally, or alternatively, user device 205 may determine the one or more existing numbers when user device 205 receives information, indicating that user device 205 is to determine the one or more existing numbers, from another device, such as self-service portal device 240.

In some implementations, user device 205 may determine the one or more existing numbers based on a user account associated with the user. For example, the user may provide, to user device 205 and via the self-service application, login information (e.g., a username, a password, a user account number, an e-mail address, etc.) associated with a user account of the user. In this example, user device 205 may provide the login information to self-service portal device 240. Self-service portal device 240 may communicate with HSS 230 to verify the user login information and/or determine one or more existing numbers associated with the user account, and self-service portal device 240 may provide (e.g., via the self-service application) information identifying the one or more existing numbers to user device 205. User device 205 may determine the one or more existing numbers based on the information provided by self-service portal device 240, and may display the one or more existing numbers (e.g., via a user interface associated with the self-service application).

In some implementations, user device 205 may determine the one or more existing numbers based on user account login information, as described in the example above. Additionally, or alternatively, user device 205 may determine the one or more existing numbers in another manner. For example, the user may provide, to user device 205 and via the self-service application, information that identifies an existing number associated with the user account (e.g., when the user does not know the username and/or password associated with the user account). In this example, user device 205 may communicate with self-service portal device 240 and/or HSS 230 to determine and/or reset the username and/or password for the user account associated with the existing number (e.g., by requiring the user to correctly answer one or more security questions, by requiring another device, associated with the existing number, to respond to a message, etc.). User device 205 may then provide the username and/or the password, determined by user device 205, in order to log in to the user account, may determine the one or more existing numbers, and may display the one or more existing numbers via a user interface of the self-service application.

As further shown in FIG. 4, process 400 may include identifying the existing number that is to be moved to the user device based on the one or more existing numbers (block 450). For example, user device 205 may identify the existing number that is to be moved to user device 205 based on the one or more existing numbers. In some implementations, user device 205 may identify the existing number after user device 205 determines the one or more existing numbers. Additionally, or alternatively, user device 205 may identify the existing number after user device 205 receives user input indicating that user device 205 is to identify the existing number, as described below.

In some implementations, user device 205 may identify the existing number based on user input. For example, user device 205 may display (e.g., via a user interface of user device 205) the one or more existing numbers, associated with the user account, determined by user device 205. In this example, the user may provide (e.g., by selecting a button, by selecting a menu item, etc.) input that identifies the existing number that is to be moved to user device 205, and user device 205 may identify the existing number based on the user input. In some implementations user device 205 may identify the existing number in another manner.

As further shown in FIG. 4, process 400 may include determining service plan information associated with moving the existing number to the user device (block 460). For example, user device 205 may determine service plan information associated with moving the existing number to user device 205. In some implementations, user device 205 may determine the service plan information after user device 205 identifies the existing number that is to be moved to user device 205.

Service plan information may include information associated with one or more services that may be provided to user device 205 via the service provider network. For example, the service plan information may include information associated a service provided via the LTE network, the EPC, the IMS core, network 250, such as information associated with a voice service (e.g., a quantity of allowable minutes, minute rollover information, etc.), information associated with a messaging service (e.g., a quantity of allowable messages, a type of allowable messages, etc.), information associated with a data service (e.g., a quantity of allowable data, a type of data service, etc.), information associated with an NFC service, information associated with a payment service, and/or another type of information associated with a service provided via the service provider network.

In some implementations, user device 205 may determine the service plan information based on the existing number. For example, assume that the existing number is associated with a particular service plan. In this example, user device 205 may provide, to self-service portal device 240, information identifying the existing number that is to move to user device 205. Self-service portal device 240 may communicate with HSS 230 to identify the particular service plan, and may determine (e.g., based on information stored by self-service portal device 240) that user device 205 may receive and/or is capable of receiving services in accordance with the particular service plan. Self-service portal device 240 may then provide service plan information, associated with the particular service plan, to user device 205. User device 205 may display the service plan information and may prompt the user whether the user wishes to keep the particular service plan or select another service plan. User device 205 may receive user input indicating that the user wishes to keep the particular service plan, and user device 205 may determine that the service plan information is the service plan information associated with the particular service plan. In some implementations, user device 205 may allow the user to modify the particular service plan (e.g., by modifying service terms, increasing and/or decreasing service limits, etc.).

In some implementations, if user device 205 receives user input indicating that the user wishes to select a different service plan, then user device 205 may determine (e.g., based on communicating with self-service portal device 240) information that identifies one or more other service plans available to user device 205, and may display the information that identifies the one or more other service plans. User device 205 may then receive user input identifying the different service plan of the one or more service plans, and user device 205 may determine, based on the user input, that the service plan information is service plan information associated with the different service plan.

Additionally, or alternatively, user device 205 may determine the service plan information based on information received from self-service portal device 240. For example, if self-service portal device 240 determines (e.g., based on information stored by self-service portal device 240 and/or another device) that user device 205 may not receive and/or is not capable of receiving services in accordance with a service plan associated with the existing number, then self-service portal device 240 may provide an indication that the user must select a different service plan. User device 205 may determine (e.g., based on information received from self-service portal device 240) information that identifies one or more other service plans available to user device 205, and may display the information that identifies the one or more other service plans available to user device 205. User device 205 may then receive user input identifying the different service plan, of the one or more service plans, and user device 205 may determine, based on the user input, that the service plan information is service plan information associated with the different service plan.

As further shown in FIG. 4, process 400 may include causing the existing number to be moved to the user device (block 470). For example, user device 205 may cause the existing number to be moved to user device 205. In some implementations, user device 205 may cause the existing number to be moved to user device 205 after user device 205 determines the service plan information. Additionally, or alternatively, user device 205 may cause the existing number to be moved to user device 205 after user device 205 receives information (e.g., user input) indicating that user device 205 is to cause the existing number to be moved to user device 205.

In some implementations, user device 205 may cause the existing service plan to be moved based on a number movement request. A number movement request may include a request to move an existing number, associated with a user account, to user device 205. In some implementations, the number movement request may include the existing number to be moved, information associated with user device 205 (e.g., an MEID, an IMEI, etc.) to which the existing number is to be moved, information that identifies a SIM card included in user device 205 (e.g., an ICCID, an IMSI, etc.), information associated with the user (e.g., an account number, a user name, a password, etc.), the service plan information, and/or other information associated with moving the existing number to user device 205. In some implementations, user device 205 may generate the number movement request, and may provide the number movement request to self-service portal device 240 (e.g., via the LTE network). Additionally, or alternatively, self-service 240 may generate the number movement request (e.g., based on information provided by user device 205).

In some implementations, self-service portal device 240 may provide the number movement request to backend system 245, and one or more devices of backend system 245 (e.g., a device management device, a number inventory device, a billing system, an access manager, a payment system, a point-of-sale system, etc.) may receive the number movement request, and may move the existing number to user device 205 such that user device 205 may receive services, via the service provider network, using the existing number. After moving the existing number to user device 205, backend system 245 may provide, to user device 205 and via self-service portal device 240, a notification that the existing number has been moved to user device 205. User device 205 may receive the notification, and may begin to receive services using the existing number (e.g., after user device 205 is restarted).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. For the purposes of example implementation 500, assume that a user has a user account with a service provider, identified as SmartWireless, and that the user account includes three existing MDNs that allow three devices, associated with the user account, to receive services via a SmartWireless network. Further, assume that the user has purchased a new user device, identified as UD4, and the user wishes to move one of the three existing MDNs to UD4.

Figure 5A:
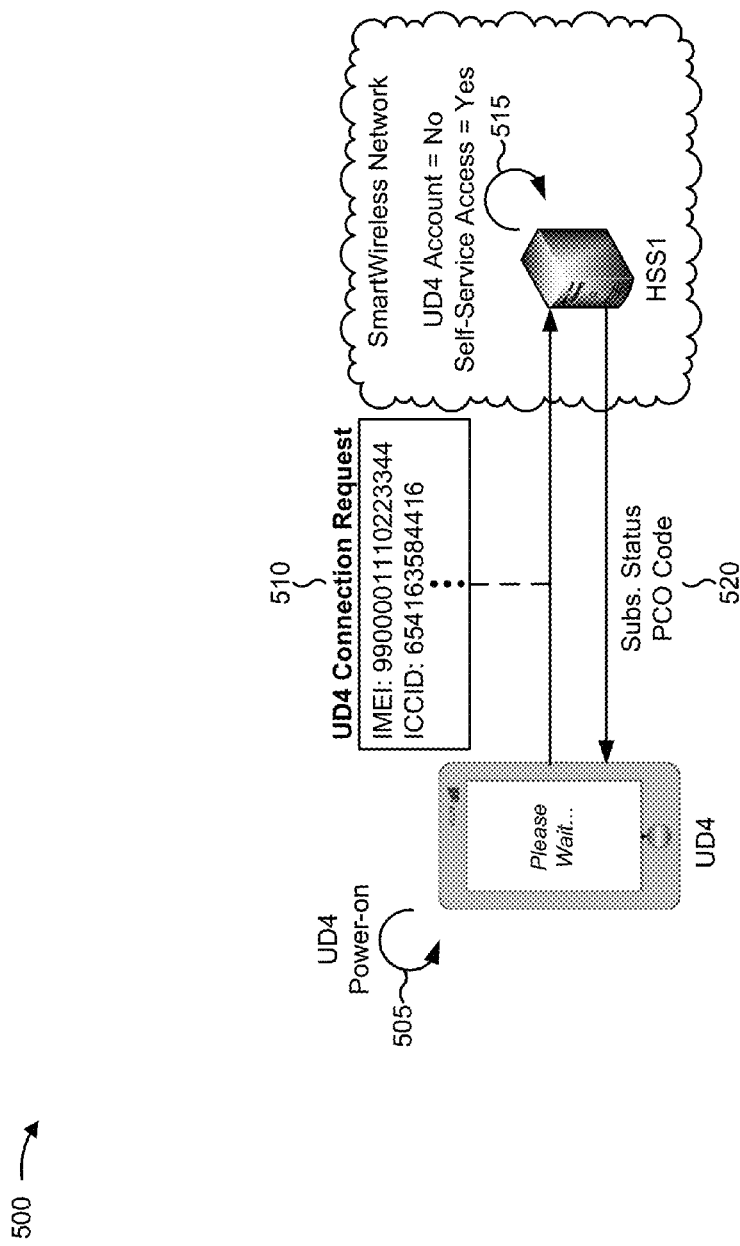
FIGS. 5A-5F are diagrams of an example implementation relating to the example process shown in FIG. 4.

As shown in FIG. 5A, and by reference number 505, UD4 may power-on for the first time. As shown by reference number 510, UD4 may provide (e.g., via an LTE network associated with the SmartWireless network) a connection request to an HSS 230 included in the SmartWireless network (e.g., HSS1). As shown, the connection request may include an IMEI associated with UD4 (e.g., IMEI: 9900001110223344) and an ICCID associated with a SIM card included in UD4 (e.g., ICCID: 654163584416). As shown by reference number 515, HSS1 may receive the UD4 connection request (e.g., via one or more other devices included in the SmartWireless network), may determine, based on the UD4 IMEI and the UD4 ICCID, that UD4 is not associated with a user account (e.g., that UD4 is not provisioned), and may determine that UD4 may be granted limited access to the SmartWireless network (e.g., for the purpose of provisioning UD4). As shown by reference number 520, HSS1 may provide, to UD4, a subscription status PCO code associated with granting UD4 limited access to the SmartWireless network.

Figure 5B:
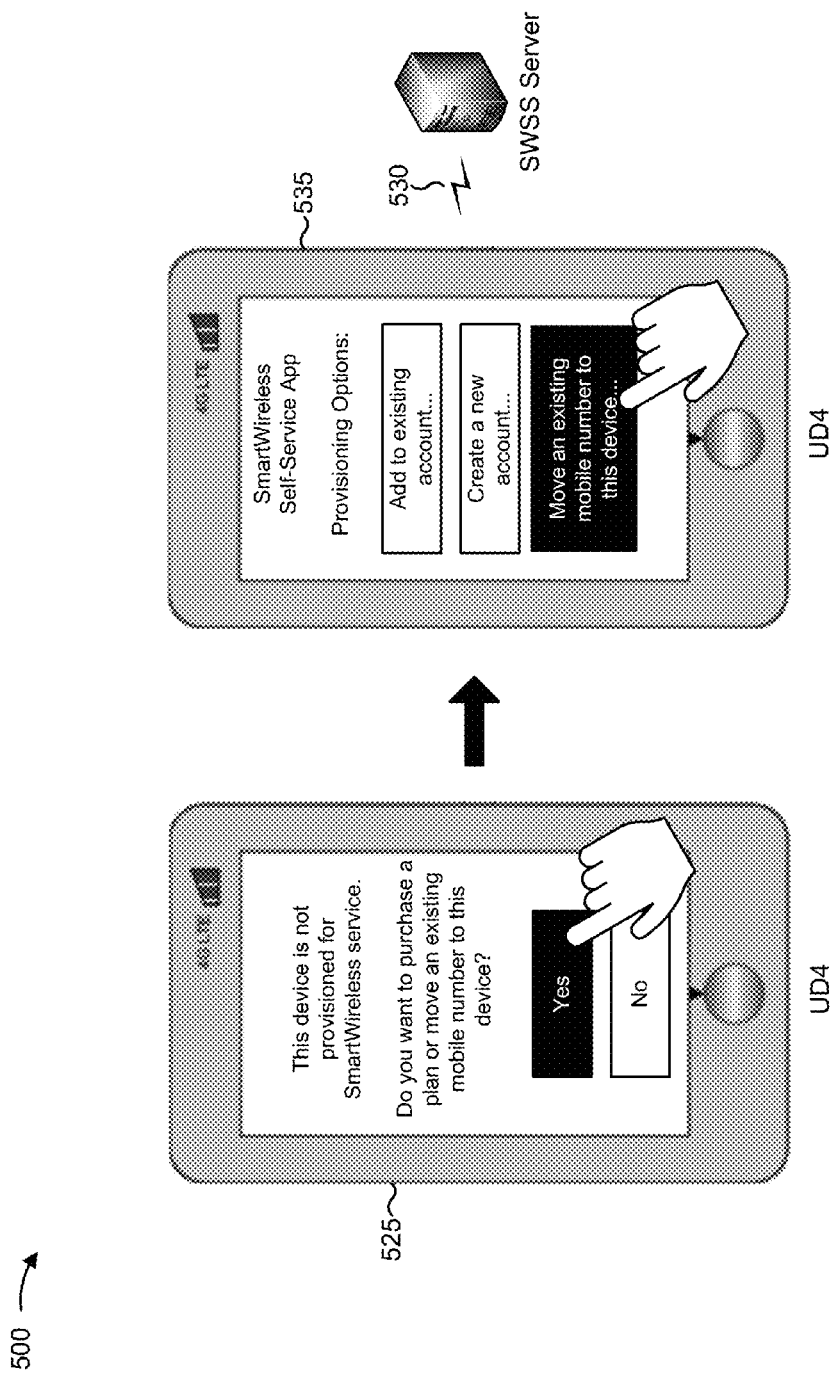

As shown in FIG. 5B, and by reference number 525, UD4 may receive the subscription status PCO code, and may display a user interface indicating that UD4 is not provisioned. As further shown, UD4 may prompt the user whether the user wishes to purchase a service plan for UD4 or move an existing MDN to UD4. As shown, the user may indicate (e.g., by selecting a Yes button), that the user wishes to purchase a plan or move an existing number.

As shown by reference number 530, UD4 may initiate a SmartWireless self-service application, and may communicate (e.g., based on being granted limited access to the SmartWireless network) with a self-service portal device 240, associated with the SmartWireless network (e.g., SWSS server), to determine provisioning options for UD4. As shown by reference number 535, the provisioning options for UD4 may include adding UD4 to an existing user account, creating a new user account, or moving an existing MDN to UD4. As shown, the user may indicate (e.g., by selecting a corresponding button) that the user wishes to move an existing MDN to UD4.

Figure 5C:
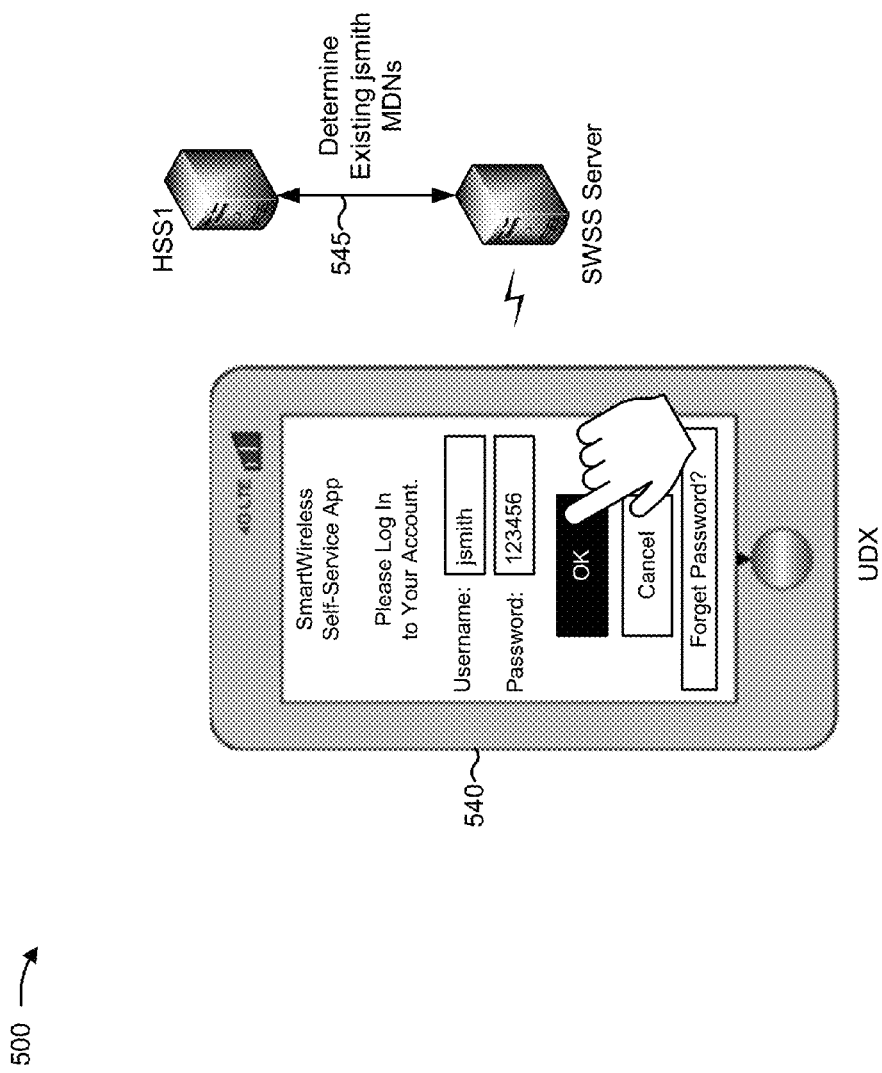

As shown in FIG. 5C, and by reference number 540, UD4 may receive (e.g., via text boxes included in a user interface associated with the SmartWireless self-service application) login information (e.g., Username: jsmith, Password: 123456) for a user account associated with the user, and UD4 may provide the login information to the SWSS server. As shown by reference number 545, the SWSS server may communicate with HSS1 to determine the three existing MDNs associated with the user account, and the SWSS server may provide information associated with the three existing MDNs to UD4 (e.g., via the SmartWireless self-service application).

Figure 5D:
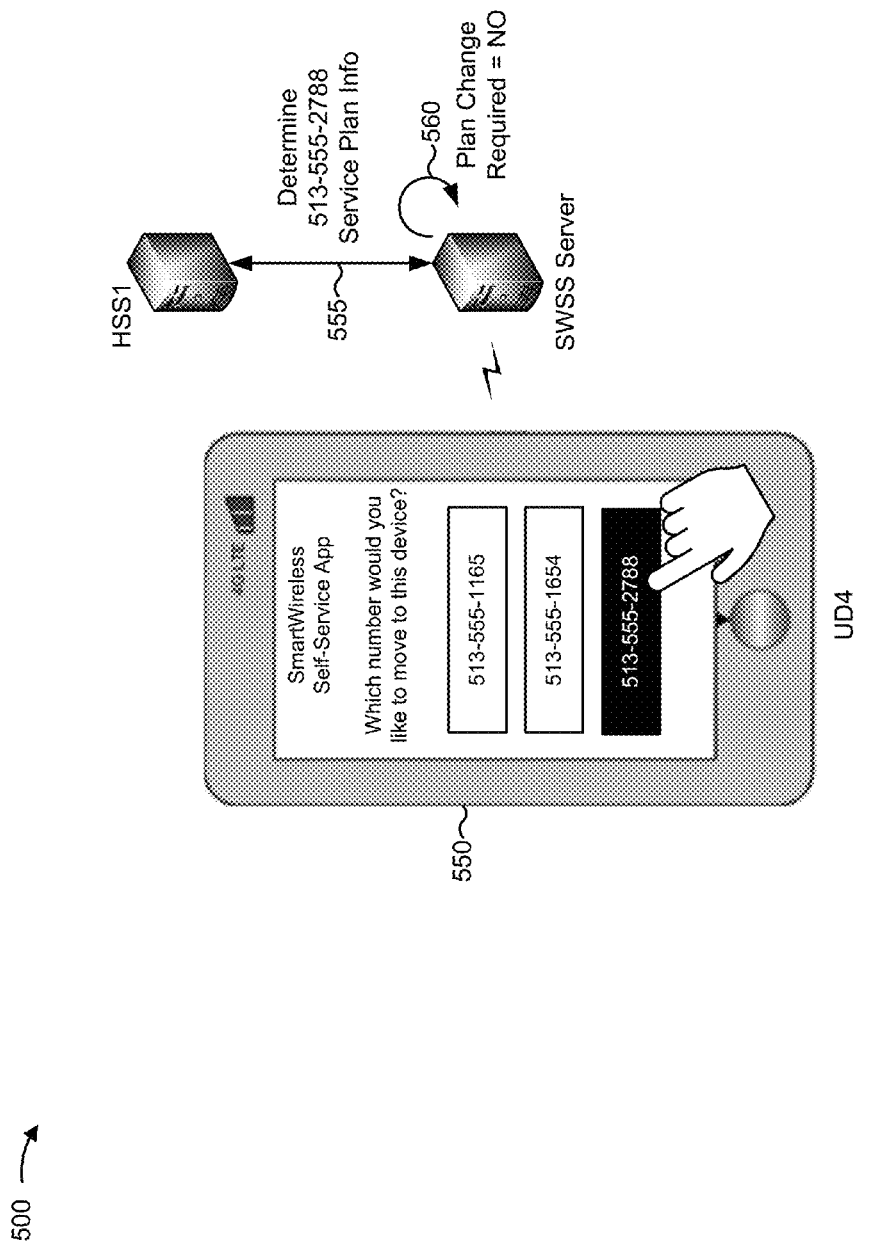

As shown in FIG. 5D, and by reference number 550, UD4 may receive the information associated with the three existing MDNs, and may prompt the user to indicate which of the three existing MDNs is to be moved to UD4. As shown, the user may select (e.g., by selecting a corresponding button) a particular MDN (e.g., 513-555-2788), of the existing MDNs, that is to be moved to UD4 (herein referred to as the selected MDN). As shown, UD4 may provide, to the SWSS server, information identifying the selected MDN. As shown by reference number 555, the SWSS server may receive the information identifying the selected MDN, and may determine (e.g., based on communicating with HSS1) service plan information associated with selected MDN. As shown by reference number 560, the SWSS server may then determine (e.g., based on information stored by the SWSS server), that a service plan change is not required in order to move the selected MDN to UD4 (e.g., assume that UD4 is capable of receiving services in accordance with the existing service plan corresponding to the selected number). The SWSS server may then provide service plan information, associated with the service plan, to UD4.

Figure 5E:
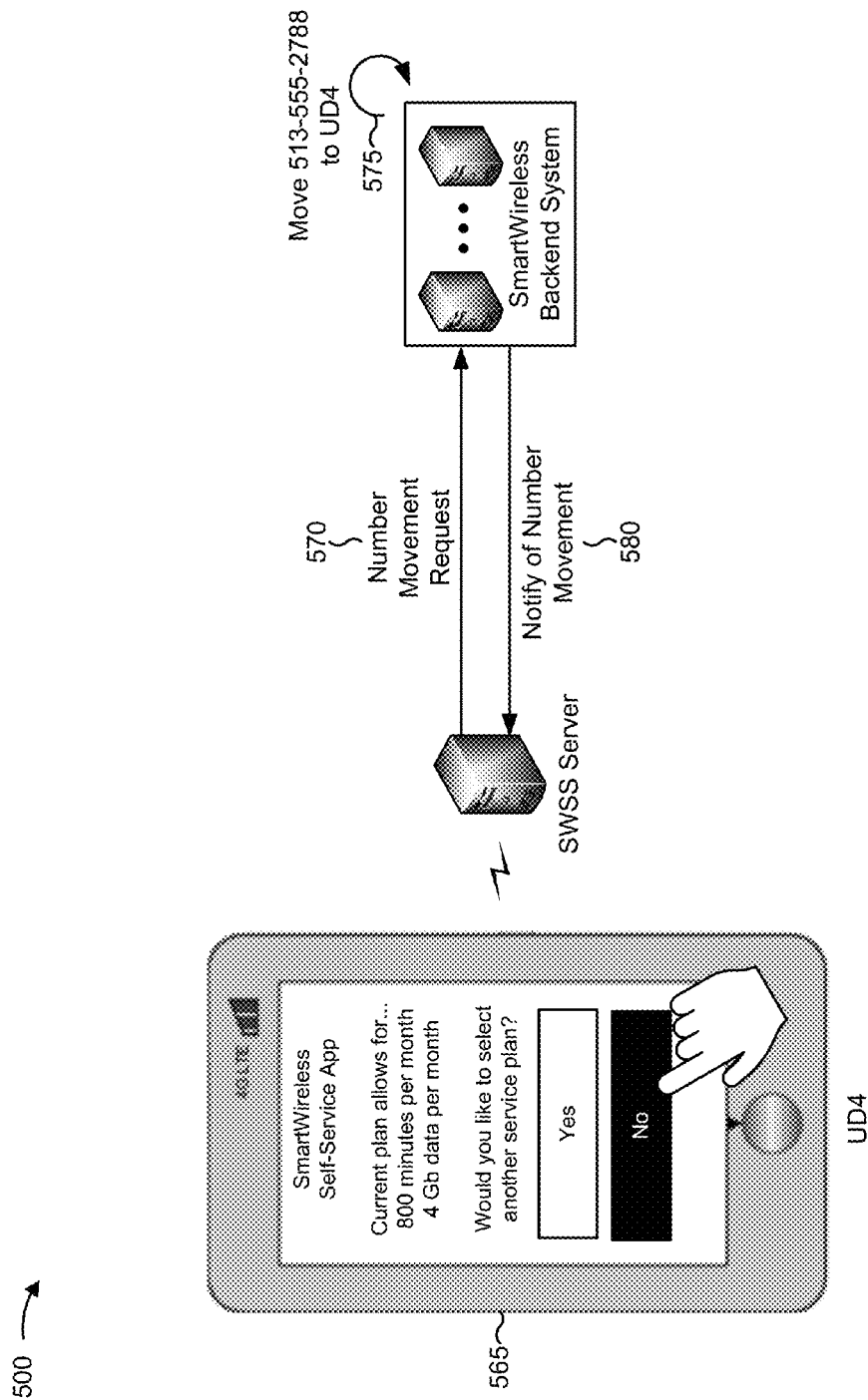

As shown in FIG. 5E, and by reference number 565, UD4 may receive the service plan information, may display the service plan information (e.g., Current plan allows for 800 minutes per month, 4Gb data per month), and may prompt the user whether the user wishes to select another service plan. As shown, the user may indicate (e.g., by selecting a No) button, that the user does not wish to select another service plan (e.g., the user may indicate the user wishes to keep the existing service plan), and UD4 may notify the SWSS server that the user wishes to keep the plan for the selected MDN.

As shown by reference number 570, UD4 may generate and provide (e.g., via the LTE network to the SWSS server) a number movement request associated with moving the selected number to UD4. As shown, the SWSS server may forward, to a SmartWireless backend system included in the SmartWireless network, the number movement request associated with moving the selected number to UD4. The number movement request may include information identifying the selected number, information identifying UD4, information identifying the SIM card included in UD4, information associated with the user, and/or other information. As shown by reference number 575, the SmartWireless backend system may receive the number movement request, and may move the selected number to UD4 (e.g., such that UD4 may receive services, provided via the SmartWireless network, using the 513-555-2788 MDN). As shown by reference number 580, the SmartWireless backend system may notify UD4 (e.g., via the SWSS server) that the selected MDN has been moved to UD4.

Figure 5F:
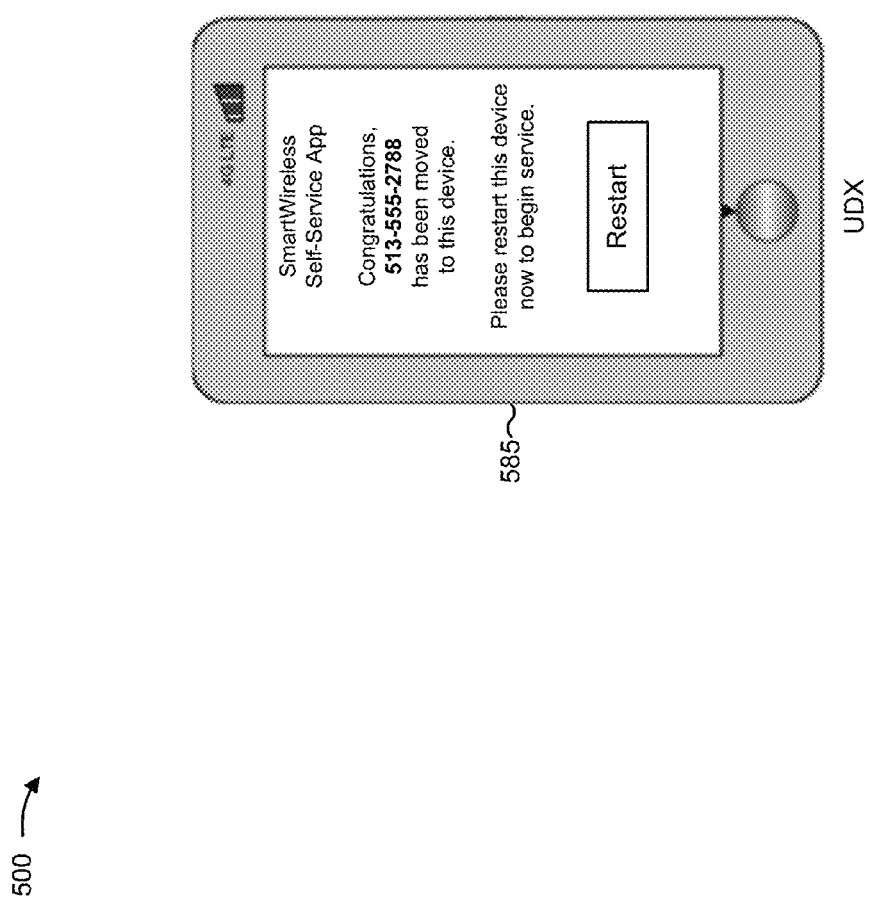

As shown in FIG. 5F, and by reference number 585, UD4 may receive the notification that the selected MDN has been moved to UD4 (e.g., "Congratulations, 513-555-2788 has been moved to this device"). As further shown, UD4 may prompt the user to restart UD4 in order for UD4 to complete provisioning of UD4 (e.g., such that UD4 may begin to receive services using the 513-555-2788 MDN).

As indicated above, FIGS. 5A-5F are provided merely as an example. Other examples are possible and may differ from what was described with regard to FIGS. 5 A-5F.

Implementations described herein may allow a user to use a second user device to move an existing number, associated with the user and a service provider, from a first user device to the second user device. In this way, the user may not be required to travel to a store associated with the service provider, call the service provider, and/or navigate a service provider website in order to move the existing number from the first user device to the second user device. This may provide an enhanced user experience and a reduced quantity of customer service calls to the service provider without significantly impacting a service provider network and/or a user device manufacturer.

The foregoing disclosure provides illustration and description, but is not intended to be exhaustive or to limit the implementations to the precise form disclosed. Modifications and variations are possible in light of the above disclosure or may be acquired from practice of the implementations. For example, while the processes and/or methods described herein are described in the context of moving an existing number from an existing (e.g., outdated, old, lost, damaged, etc.) user device to another (e.g., new, different, undamaged, un-provisioned, etc.) user device, these processes and/or methods may be equally applied to moving an existing number in another manner, such as moving an existing number from to an existing (e.g., outdated, old, lost damaged, etc.) SIM card associated with a user device to a new (e.g., new, different, undamaged, un-provisioned, etc.) SIM card associated with the user device.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
   one or more processors to:
      send, via a cellular network, a connection request associated with receiving a service provided by a service provider,
         the user device being un-provisioned for receiving the service when the connection request is sent;
      receive, via the cellular network, a response,
         the response indicating that the user device has limited access to the cellular network;
      identify, based on receiving the response indicating that the user device has limited access to the cellular network, a user account,
         the user account including an account, associated with the service provider, to which the user device is to be added for provisioning of the service, and
         the user account being associated with a set of existing mobile directory numbers (MDNs);
      identify a particular existing MDN, of the set of existing MDNs associated with the user account, that is to be moved to the user device; and
      send, via the cellular network, a movement request to move the particular existing MDN to the user device,
         the movement request being sent causing the particular existing MDN to be associated with the user device,
            the particular existing MDN being associated with the user device such that the user device is provisioned to receive the service using the particular existing MDN.

2. The user device of claim 1, where the one or more processors are further to:
   provide, for display and based on receiving the response, a user interface associated with moving the particular existing MDN to the user device;
   receive, via the user interface, user input indicating that the particular existing MDN is to be moved to the user device; and
   determine that the particular existing MDN is to be moved to the user device based on the user input.

3. The user device of claim 1, where the one or more processors are further to:
   receive an indication that an existing service plan, associated with the particular existing MDN, is to be kept when the particular existing MDN is moved to the user device; and
   send, via the cellular network, an indication that the existing service plan is to be kept when the particular existing MDN is moved to the user device.

4. The user device of claim 1, where the one or more processors are further to:
   receive an indication that an existing service plan, associated with the particular existing MDN, cannot be kept when the particular existing MDN is moved to the user device;
   identify a different service plan that is to replace the existing service plan when the particular existing MDN is moved to the user device; and
   send, via the cellular network, information that identifies the different service plan.

5. The user device of claim 1, where the one or more processors are further to:
   provide, for display, a user interface associated with identifying the user account;
   receive, via the user interface, login information associated with the user account; and
   provide, via the cellular network, the login information associated with the user account.

6. The user device of claim 1, where the one or more processors are further to:
   provide, for display, a user interface associated with selecting the particular existing MDN,
      the user interface including information that identifies the set of existing MDNs associated with the user account;
   receive, based on providing the user interface, user input that identifies the particular existing MDN; and
   where the one or more processors, when identifying the particular existing MDN, are to:
      identify the particular existing MDN based on the user input.

7. The user device of claim 1, where the one or more processors, after sending the movement request, are further to:
   receive a notification that the particular existing MDN has been associated with the user device; and
   provide, for display, information indicating that the particular existing MDN has been associated with the user device.

8. A computer-readable medium storing instructions, the instructions comprising:
   one or more instructions that, when executed by one or more processors of a user device, cause the one or more processors to:
      provide a connection request associated with the user device receiving a service,
         the user device being un-provisioned for receiving the service when the connection request is provided, and the connection request being provided by the user device via a cellular network;
receive a response,
the response indicating that the user device has limited access to the cellular network, and
the response being received by the user device via the cellular network;
identify, based on receiving the response indicating that the user device has limited access to the cellular network, a user account,
the user account including an account, associated with a service provider of the service, to which the user device is to be added for provisioning of the service, and
the user account being associated with a set of existing mobile directory numbers (MDNs);
identify a selected existing MDN, of the set of existing MDNS associated with the user account, that is to be moved to the user device,
the selected existing MDN being identified by the user device; and
provide a movement request associated with moving the selected existing MDN to the user device,
the movement request being provided by the user device via the cellular network, and
the movement request being provided causing the selected existing MDN to be associated with the user device,
the selected existing MDN being associated with the user device causing the user device to be provisioned to receive the service using the selected existing MDN.

9. The computer-readable medium of claim 8, where the one or more instructions, when executed by the one or more processors, further cause the one or more processors to:
provide, for display and based on receiving the response, a user interface associated with moving the selected existing MDN to the user device;
receive, via the user interface, user input indicating that the selected existing MDN is to be moved to the user device; and
determine that the selected existing MDN is to be moved to the user device based on the user input.

10. The computer-readable medium of claim 8, where the one or more instructions, when executed by the one or more processors, further cause the one or more processors to:
receive an indication that an existing service plan, associated with the selected existing MDN, is to be modified when the selected existing MDN is moved to the user device; and
send, via the cellular network, an indication that the existing service plan is to be modified when the selected existing MDN is moved to the user device.

11. The computer-readable medium of claim 8, where the one or more instructions, when executed by the one or more processors, further cause the one or more processors to:
receive an indication that an existing service plan, associated with the selected existing MDN, cannot be kept when the selected existing MDN is moved to the user device;
identify a different service plan that is to replace the existing service plan when the selected existing MDN is moved to the user device; and
send, via the cellular network, information that identifies the different service plan.

12. The computer-readable medium of claim 8, where the one or more instructions, when executed by the one or more processors, further cause the one or more processors to:
provide, for display, a user interface associated with identifying the user account;
receive, via the user interface, login information associated with the user account; and
provide, via the cellular network, the login information associated with the user account.

13. The computer-readable medium of claim 8, where the one or more instructions, when executed by the one or more processors, further cause the one or more processors to:
power-on the user device; and
automatically provide the connection request based on the user device being powered-on.

14. The computer-readable medium of claim 8, where the one or more instructions, after causing the one or more processors to provide the movement request, further cause the one or more processors to:
receive a notification that the selected existing MDN has been associated with the user device; and
provide, for display, information indicating that the selected existing MDN has been associated with the user device.

15. A method, comprising:
sending, by a user device and via a cellular network, a connection request associated with receiving a service,
the user device being un-provisioned for receiving the service when the connection request is sent;
receiving, by the user device and via the cellular network, a response,
the response indicating that the user device has limited access to the cellular network;
identifying, by the user device and based on receiving the response indicating that the user device has limited access to the cellular network, a user account,
the user account including an account, associated with a service provider of the service, to which the user device is to be added for provisioning of the service, and
the user account being associated with a set of existing numbers;
identifying, by the user device, a particular existing number, of the set of existing numbers associated with the user account, that is to be moved to the user device; and
sending, by the user device and via the cellular network, a movement request associated with moving the particular existing number to the user device,
the movement request being sent to cause the particular existing number to be associated with the user device such that the user device is provisioned to receive the service using the particular existing number.

16. The method of claim 15, further comprising:
providing, for display and based on receiving the response, a user interface associated with moving the particular existing number to the user device;
receiving, via the user interface, user input indicating that the particular existing number is to be moved to the user device; and
determining that the particular existing number is to be moved to the user device based on the user input.

17. The method of claim 15, further comprising:
receiving an indication that an existing service plan, associated with the particular existing number, is to be kept when the particular existing number is moved to the user device; and sending, via the cellular network, an indication that the existing service plan is to be kept when the particular existing number is moved to the user device.

18. The method of claim 15, further comprising:

providing, for display, a user interface associated with identifying the user account;

receiving, via the user interface, login information associated with the user account; and providing, via the cellular network, the login information associated with the user account.

19. The method of claim 15, further comprising:

powering-on the user device; and automatically sending the connection request based on powering-on the user device.

20. The method of claim 15, further comprising:

receiving, after sending the movement request, a notification that the particular existing number has been associated with the user device; and providing, for display, information indicating that the particular existing number has been associated with the user device.

\* \* \* \* \*